United States Patent
Palani et al.

(10) Patent No.: US 10,409,728 B2
(45) Date of Patent: Sep. 10, 2019

(54) FILE ACCESS PREDICATION USING COUNTER BASED EVICTION POLICIES AT THE FILE AND PAGE LEVEL

(71) Applicant: Futurewei Technologies, Inc., Plano, TX (US)

(72) Inventors: Gopinath Palani, Sunnyvale, CA (US); Jun Xu, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 109 days.

(21) Appl. No.: 15/590,741

(22) Filed: May 9, 2017

(65) Prior Publication Data
US 2018/0329712 A1  Nov. 15, 2018

(51) Int. Cl.
| G06F 12/121 | (2016.01) |
| G06F 12/123 | (2016.01) |
| G06F 12/127 | (2016.01) |
| G06F 12/0811 | (2016.01) |
| G06F 12/128 | (2016.01) |
| G06F 12/0868 | (2016.01) |
| G06F 12/0895 | (2016.01) |
| G06F 12/0893 | (2016.01) |

(52) U.S. Cl.
CPC ...... *G06F 12/0895* (2013.01); *G06F 12/0811* (2013.01); *G06F 12/0868* (2013.01); *G06F 12/0893* (2013.01); *G06F 12/121* (2013.01); *G06F 12/123* (2013.01); *G06F 12/127* (2013.01); *G06F 12/128* (2013.01); *G06F 2212/1024* (2013.01); *G06F 2212/154* (2013.01); *G06F 2212/163* (2013.01); *G06F 2212/314* (2013.01); *G06F 2212/462* (2013.01); *G06F 2212/463* (2013.01); *G06F 2212/6026* (2013.01)

(58) Field of Classification Search
CPC .............. G06F 9/3832; G06F 12/0215; G06F 12/0811; G06F 12/0868; G06F 12/0895; G06F 2212/1024; G06F 2212/60; G06F 2212/6026; G06F 12/12; G06F 12/121; G06F 12/122; G06F 12/123; G06F 12/124; G06F 12/125; G06F 12/126; G06F 12/127; G06F 12/128; G06F 17/30132
See application file for complete search history.

(56) References Cited

U.S. PATENT DOCUMENTS

| 7,143,393 B1 * | 11/2006 | Ezra ................... G06F 12/084 717/127 |
| 2006/0010293 A1 * | 1/2006 | Schnapp ............. G06F 12/0804 711/119 |
| 2014/0136792 A1 * | 5/2014 | Frachtenberg ........ G06F 12/121 711/135 |

(Continued)

*Primary Examiner* — Yaima Rigol
(74) *Attorney, Agent, or Firm* — Vierra Magen Marcus LLP (57) ABSTRACT

The disclosure relates to technology for predicting file access patterns by identifying one or more files stored in a first cache and one or more pages associated with each of the one or more files in a second cache. The one or more files in the first cache are evicted based on a first eviction policy and, for each of the one or more files, the one or more pages in the second cache are evicted based on a second eviction policy. Access patterns of the one or more files based on the first and second eviction policies may then be predicted.

21 Claims, 8 Drawing Sheets

(56) References Cited

U.S. PATENT DOCUMENTS

2015/0269179 A1* 9/2015 McClements ......... G06F 12/084
    711/130
2017/0357588 A1* 12/2017 Moyer ................ G06F 12/0811

* cited by examiner

FILE ACCESS PREDICATION USING COUNTER BASED EVICTION POLICIES AT THE FILE AND PAGE LEVEL

BACKGROUND

A computing environment may include main storage (a.k.a., main memory), as well as auxiliary storage. Main storage is storage accessible to a processor which is randomly addressable by, for instance, an absolute address. Main storage is considered fast access storage compared to auxiliary storage, such as direct access storage devices or storage class memory.

Storage class memory, such as non-volatile memory (NVM), which is an external storage space outside of classical main storage, provides faster access than direct access storage devices. Unlike direct access storage devices, storage class memory is not typically implemented as mechanical-arm spinning disks, but instead, non-mechanical solid state parts. Thus, storage class memory is particularly useful when caching data in memory that is frequently accessed, since it accelerates access (reduces latency) to the data from slower storage media. As the cache becomes full, an eviction policy, such as least recently used (LRU) or adaptive replacement cache (ARC), is responsible for removing less frequently accessed data from the memory so as to further reduce latency.

BRIEF SUMMARY

According to one aspect of the present disclosure, there is provided a method for predicting file access patterns including identifying one or more files stored in a first cache and one or more pages associated with each of the one or more files in a second cache; evicting the one or more files in the first cache based on a first eviction policy and, for each of the one or more files, the one or more pages in the second cache based on a second eviction policy; and predicting an access pattern of the one or more files based on the first and second eviction policies.

Optionally, in any of the preceding aspects, the method further includes counting references to the one or more files stored in the first cache using a first counter and references to the one or more pages stored in the second cache using a second counter; updating the first counter each time the one or more files stored in the first cache is referenced and the second counter each time the one or more pages stored in the second cache is referenced; defining the first eviction policy based on the first counter and the second eviction policy based on the second counter, where the first and second counters record an access count value and an access time.

Optionally, in any of the preceding aspects, the method further includes counting references to the one or more files stored in the first cache comprises increasing the first counter associated with each of the one or more files when the associated file is accessed in the first cache, wherein the first counter maintains the access count value and access time; and counting references to the one or more pages stored in the second cache comprises increasing the second counter of the one or more pages associated with the accessed file when the associated page stored in the second cache is accessed, wherein the second counter maintains the access count value and access time.

Optionally, in any of the preceding aspects, the first eviction policy includes organizing the one or more files stored in the first cache based on an access type; traversing the first cache to determine a maximum access count value for the one or more files based on a count value of the first counter; creating one or more segments in the first cache to store the one or more files, where the number of segments is equal to the maximum access count value divided by a predefined value; updating each of the one or more segments to include the one or more files having the count value falling within a range of the one or more segments; and evicting the one or more files from the one or more segments, beginning with the one or more segments having a lowest range, until a first eviction ratio is satisfied.

Optionally, in any of the preceding aspects, the updating includes updating the maximum access count value to the count value of the one or more files having a maximum count value; and the dividing includes updating the one or more segments in the first cache such that the number of segments is equal to the updated maximum access count value divided by the predefined value.

Optionally, in any of the preceding aspects, a range value of each of the one or more segments is defined as the maximum access count value divided by a total number of the one or more segments.

Optionally, in any of the preceding aspects, the second eviction policy, for each of the one or more files, includes traversing the second cache to determine a maximum access count value for the one or more pages based on a count value of the second counter; creating one or more segments in the second cache to store the one or more pages, where the number of segments is equal to the maximum access count value divided by a predefined value; updating each of the one or more segments to include the one or more pages having the count value falling within a range of the one or more segments; and evicting the one or more pages from the one or more segments, beginning with the one or more segments having a lowest range, until a second eviction ratio is satisfied.

Optionally, in any of the preceding aspects, the updating includes updating the maximum access count value to the count value of the one or more pages having a maximum count value; and the dividing comprises: updating the one or more segments in the second cache such that the number of segments is equal to the updated maximum access count value divided by the predefined value.

Optionally, in any of the preceding aspects, the evicting further includes evicting the one or more pages from the second cache based on the access time beginning with the one or more segments having a least recent time of access.

Optionally, in any of the preceding aspects, the first and second counters use the access count value and the access time to determine the access pattern for each of the one or more files and pages as one of sequential or random.

Optionally, in any of the preceding aspects, the method further includes storing the access pattern for each of the one or more files and pages to predict the access pattern of the one or more files.

According to one aspect of the present disclosure, there is provided a device for predicting file access patterns, including a non-transitory memory storage comprising instructions; and one or more processors in communication with the memory, wherein the one or more processors execute the instructions to perform operations including identifying one or more files stored in a first cache and one or more pages associated with each of the one or more files in a second cache; evicting the one or more files in the first cache based on a first eviction policy and, for each of the one or more files, the one or more pages in the second cache based on a second eviction policy; and predicting an access pattern of the one or more files based on the first and second eviction policies.

According to one aspect of the present disclosure, there is provided a non-transitory computer-readable medium storing computer instructions for predicting file access patterns, that when executed by one or more processors, perform the steps of identifying one or more files stored in a first cache and one or more pages associated with each of the one or more files in a second cache; evicting the one or more files in the first cache based on a first eviction policy and, for each of the one or more files, the one or more pages in the second cache based on a second eviction policy; and predicting an access pattern of the one or more files based on the first and second eviction policies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for predicting file access patterns, and in particular, to predicting file access patterns based on counter based eviction policies.

Companies store tremendous amounts of data (e.g., photographs, messages, e-mails, electronic documents, or healthcare records). Access to this data can often follow recognizable patterns. For example, when a sporting event is providing a live scoring feed to a mobile application, the updated scoring may be accessed frequently within a short period of time of being posted and then accessed far less frequently. Other types of data may also be accessed in some predictable pattern.

Embodiments of the disclosure employ counter based eviction policies to determine these predictable access patterns and make more efficient decisions regarding the storage location within a storage system and/or caching. For example, a client may submit a query to access a particular file. As the file is accessed, a counter tracks the number of references being made thereto. Pages associated with the files are also tracked by counters to determine how many times the page is referenced. Using the file and page counters, the system established a file eviction policy and a page eviction policy that determines how to evict the files and pages that are least recently used and/or accessed. This information may also be stored as historical data that the system may analyze to predict future access patterns of files and pages for use in eviction.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
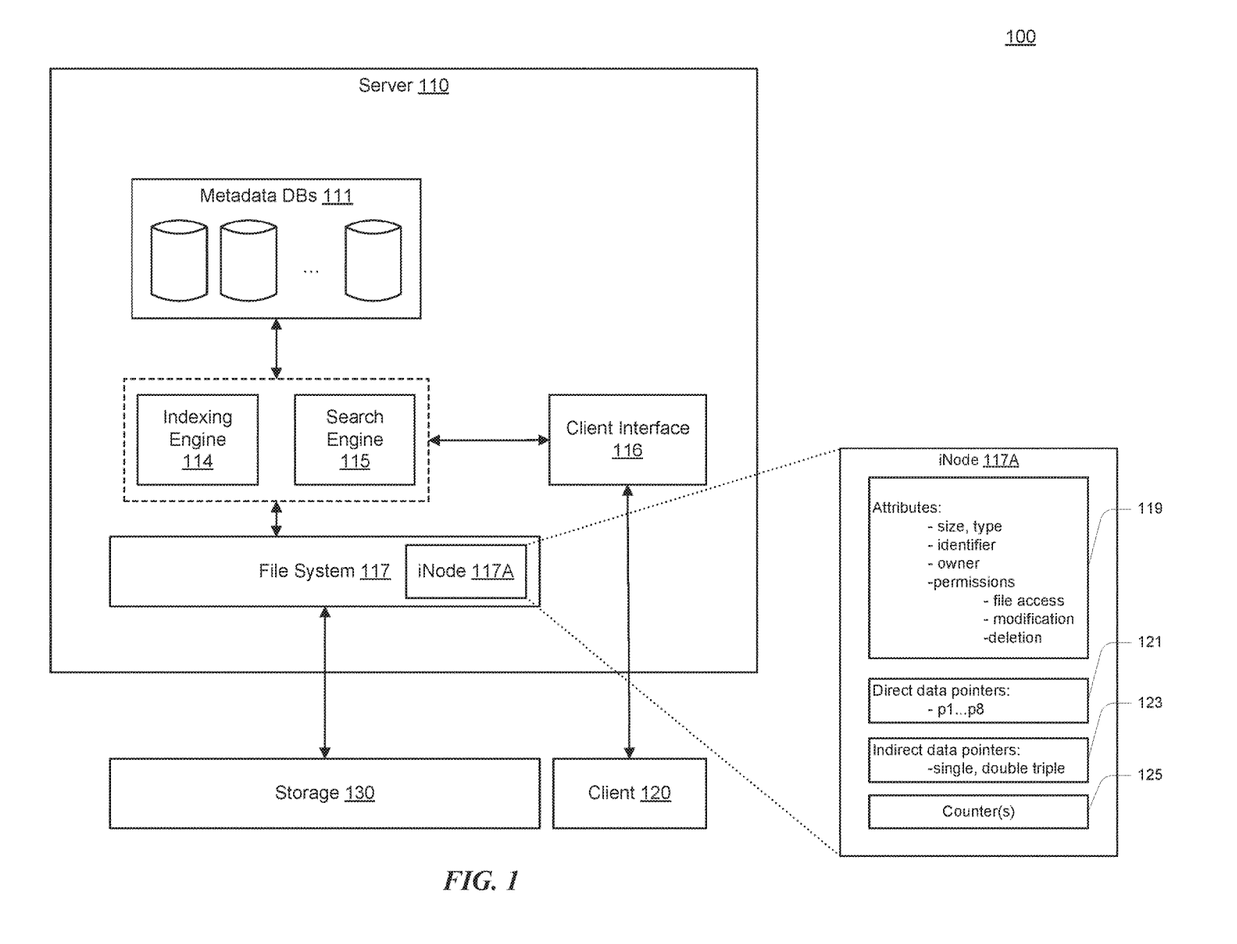
FIG. 1 illustrates an example embodiment of a file storage system.

FIG. 1 illustrates an example embodiment of a file storage system. The file storage system 100 includes, but is not limited to, a server 110, a client 120, and a storage device 130. As disclosed, the server 110 is communicatively coupled to the storage device 130 and the client 120, for example via a network (not shown).

The storage 130 may be any device suitable for storing data. For example, the storage 130 may be a hard disk drive or a flash drive. In an embodiment, the storage device 130 may be a large-scale storage device and/or system that stores billions of files, millions of directories, and/or petabytes of data. Although the storage 130 is illustrated as an external component of the server 110, the storage device 130 may be an internal component of the server 110.

The client 120 may be, for example, a user or a user program that queries the server 110 for files stored in the storage device 130. In addition, the client 120 may add a file to the storage device 130, modify an existing file in the storage device 130, and/or delete a file from the storage device 130. In some embodiments, the client 120 may be coupled to the server 110 via a network.

The server 110 may be, for example, a virtual machine, (VM), a computing machine, a network server, or any device, configured to manage file storage, file access, and/or file search on the storage device 130. The server 110 includes, but is not limited to, a plurality of metadata databases (DBs) 111, an indexing engine 114, a search engine 115, a client interface 116, and a file system 117.

The file system 117, which includes an index node (inode) 117A, may be a component communicatively coupled to the storage device 130 and configured to manage the naming and storage locations of files in the storage device 130. For example, the file system 117 may include multiple levels of directories and paths to the files stored on the storage device 130.

The inode 117A may be a data structure in a file system that describes a file system object such as a file or a directory. Each inode 117A stores the attributes and disk block location(s) of the object's data. In the disclosed embodiment, the inode 117A is a data structure that contains attributes 119 that describe various aspects of the object including owner, permissions, parent FID, object type, and size.

In one example embodiment, the inode 117A data structure is an index cache tree data structure including an index cache table. The index cache tree data structure uses a tree structure (e.g., a b-tree, a b*-tree, etc.) to decrease the retrieval time for entries within the index cache table. By using a data structure that enables efficient searching (e.g., binary search, etc.) of entries contained in the index cache table, increased speed can be gained when determining whether a desired logical to physical address mapping is contained within the index cache table.

In addition to containing attributes, the inode 117A may contain a block pointer array having pointers to data blocks of a file or page. The inode 117A pointer array may contain direct pointers 121 (p1 . . . p8) to disk blocks that contain the data in the object. Each of these pointers has an associated copy-on-write bit stored with the pointers 119. The inode 117A pointer array may also contain indirect pointers 123 (e.g., single, double or triple) to indirect data. In the case of local files (an object in the file system that contains bytes in a single container). The indirect pointers 123 can also be a pointer to a B+ tree that contains the object data, along with a copy-on-write bit for that tree. Other implementations are possible where a combination of pointers are used simultaneously.

The inode 117A also contains counter(s) 125 which, as described below in more detail, will be implemented to monitor and track access count and access time of files and pages stored in memory.

The indexing engine 114 may also be a component configured to manage indexing of the files stored on the storage device 130. The indexing engine 114 indexes files by metadata, which may include base names of the files, pathnames of the files, and/or any file system attributes, such as file types, file extensions, file sizes, file access times, file modification times, file change times, number of links associated with the files, user IDs, group IDs, and file permissions. For example, for a file "foo" stored under a directory /x/y/z, the base name is "foo" and the pathname is /x/y/z. In addition, the metadata may include custom attributes and/or tags, such as file characteristics (e.g., audio and video) and/or content-based information. Custom attributes are specific metadata customized for a file, for example, generated by a user or the client 120.

The indexing engine 114 partitions the file system 117 into a plurality of segments, limiting the maximum size of a partition, and generating metadata indexes by partitions. For example, in a large-scale storage, the indexing engine 114 may divide the file system 117 into a very large number of partitions. By partitioning the file system 117 into multiple partitions, searches may be performed more efficiently.

After dividing the file system 117 into partitions, the indexing engine 114 may generate metadata DBs 111 for storing metadata associated with the file system 117. The indexing engine 114 may generate the metadata as the directories are scanned. Thus, in one embodiment, the file system 117 is indexed and the metadata DBs 111 are organized based on the same temporal order as the scanning of the directories. In an embodiment, the indexing engine 114 examines each file in the file system 117 separately to generate metadata for the file, for example, by employing a system call "stat( )" to retrieve file attributes 119.

The indexing engine 114 maps the metadata to inode numbers and device numbers. The device number identifies the file system 117. The inode number is unique within the file system 117 and identifies a file system object in the file system 117, where a file system object may be a file or a directory. For example, a file may be associated with multiple string names and/or paths, the file may be uniquely identified by a combination of inode number and device number.

The client interface 116 interfaces queries and query results between the client 120 and the search engine 115. For example, when the client interface 116 receives a file query from the client 120, the client interface 116 may parse and/or format the query so that the search engine 115 may operate on the query. When the client interface 116 receives a query result from the search engine 115, the client interface 116 may format the query result, for example, according to a server-client protocol and send the query result to the client 120.

The search engine 115 is a component configured to receive queries from the client 120 via the client interface 116, determines partitions that comprise data relevant to the queries, searches the metadata DBs 111 associated with the partitions, and sends query results to the client 120 via the client interface 116.

It is appreciated that the system 100 is a non-limiting example and may be configured as shown or alternatively configured with additional or fewer components as determined by a person of ordinary skill in the art to achieve similar functionalities.

Figure 2:
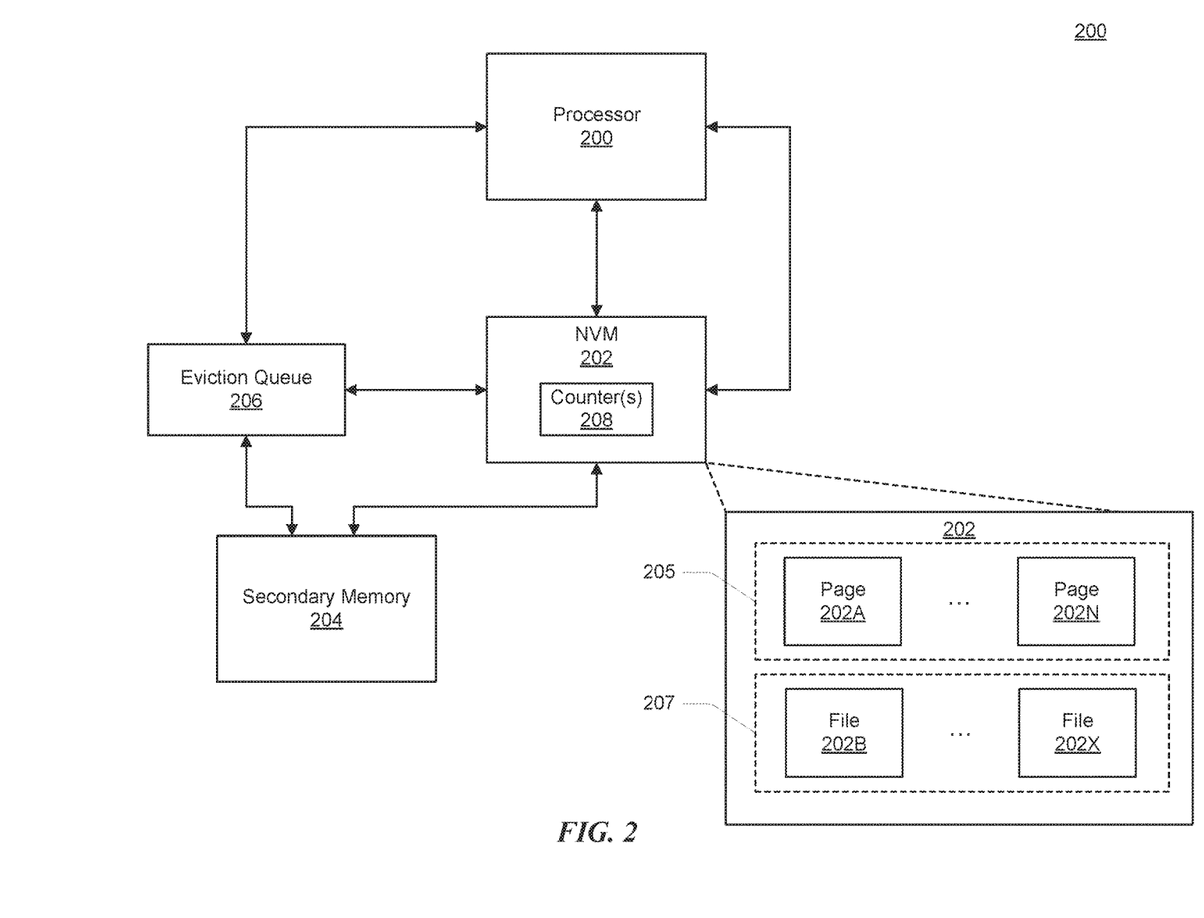
FIG. 2 illustrates an example computer system that evicts files and pages from non-volatile memory.

FIG. 2 illustrates an example computer system that evicts files and pages from non-volatile memory. The system 200 includes, for example, a processor 200 with an associated NVM and secondary memory 204. When files 202A-202N or pages 202B-202X are evicted from the cache 202, they are first placed into an eviction queue 206. Files 202A-202N and pages 202B-202X in the eviction queue 206 are then written to the secondary memory 204, depending on bus activity. If a file 202A-202N or page 202B-202X, while in the eviction queue 206, is requested by processor 200, it may be read directly from the eviction queue, or it may be written back to the cache 202, or both.

The NVM 202 in one embodiment is a cache memory placed between processor 200 and secondary memory 204. Caches can be embodied in hardware (such as CPU caches) and/or software (such as Memcached). In some cases, caches can also be layered across several storage layers or tiers. When the processor 200 needs to access data stored in the secondary memory 204, it first looks to the cache 202 to see whether the data is available. As the processor 200 reads data from the second memory 204, a copy of the data is stored in the cache 202. Similarly, when the processor 200 writes data to secondary memory 204, the data is stored in the cache 202. When the processor 200 subsequently access memory addresses, the processor 200 first checks the cache 202 rather than the secondary memory 204.

As illustrated, the cache 202 includes a file level cache 207 for storing files 202A-202N and a page-level cache 205 for storing pages 202B-202N corresponding to the files. In one embodiment, the inode 117A exists in the cache 202 as discussed above with reference to FIG. 1. A single cache 202 is depicted in the embodiment. However, it should be appreciated that any number of non-volatile memories may be employed as the cache. For example, one cache may be a file-level cache 207 and another cache may be a page-level cache 205.

The page cache 205 stores the pages 202A-202N to store data retrieved from the secondary memory 204 or from another storage. Allocating a page in the page cache 205 can refer to provisioning, configuring, or creating a defined region of the page cache 205 to store specific data (e.g. data read from the secondary memory 204).

In accordance with some implementations, the data that is stored in the pages 202A-202N of the page cache 205 can include machine-readable instructions, files, and other data that are accessed with higher frequency. As a result, the data that is stored in the page cache 205 can provide a profile of system use. Data that is frequently and repeatedly accessed is more likely to be present in the page cache 205, and thus it is more likely that an application or operating system would be able to use data in the page cache 205 during operation of the application or operating system.

The cache 202 may also include one or more counters 208 that are responsible for measuring the activity of the files 202B-202X and pages 202A-202N stored in the cache 202. For example, the counters 208 may count the number of times a file or page is referenced or accessed (e.g., read access or write access) as well as the time of access. In one embodiment, the file level cache 207 has one or more counters to monitor files access, and the page level cache 205 has one or more counters to monitor page access. Accordingly, each file and page may have its own counter 208 or groups of files or groups of pages may share a counter 208. The counters 208 may include, but are not limited to, a hit counter to measure the number of times a file or page is references in the cache 202, a miss counter to measure the number of times a file or page is referenced and not already stored in the cache 202 (requiring a fetch from secondary memory 204), an access time counter to record the time at which the file or page was referenced, etc. Counter values may be stored in the NVM 202 or the secondary memory 204 and maintained to record historical values of the counter (e.g. record and maintain records for each of the counters).

The secondary memory 204, which is separate from the non-volatile memory 202, is typically implemented with a slower storage than the non-volatile memory 202. Examples of the secondary memory 204 can include a solid state drive (e.g. implemented with one or multiple flash memory devices), a disk-based storage, and so forth. The secondary storage 204 can also be implemented using memory devices (for example, another non-volatile memory).

Although not depicted, the system 100 may also include an operating system that performs file access management (to manage access of files), performs process management (to manage execution of processes), etc.

Figure 3:
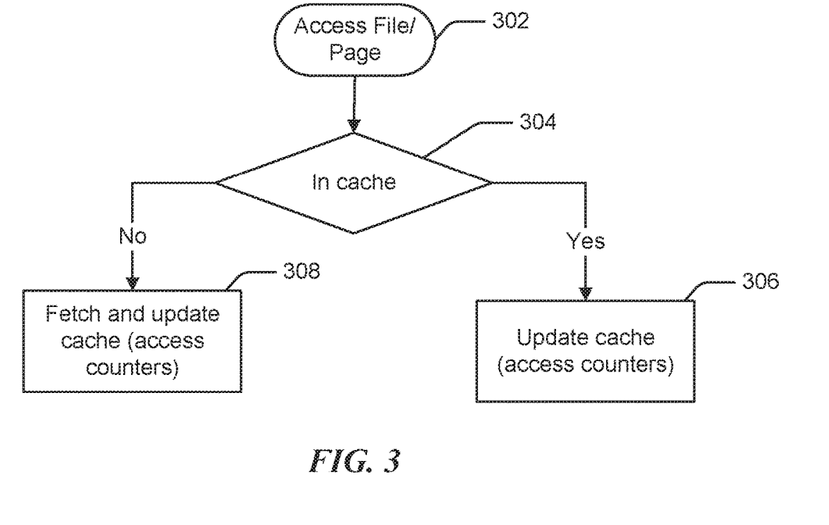
FIG. 3 illustrates a process of accessing and counting references to files and pages in cache in accordance with FIGS. 1 and 2.

FIG. 3 illustrates a process of accessing and counting references to files and pages in cache in accordance with FIGS. 1 and 2. The process described below may be implemented by server 110. However, it is appreciated that any component depicted in the example systems 100 and 200 (or the node and system described in FIGS. 8 and 9 below) may be responsible for implementation of the process.

As explained in the embodiments above, one or more files 202B-202X and one or more pages 202A-202N may be stored in cache 202 and/or secondary memory 204. The process illustrated in the figure describes what occurs as files and or pages are referenced (e.g., accessed) in response to a query from a client, such as client 120 (FIG. 1).

When accessing the cache 202 results in retrieval of data in response to the query from the cache 202 (i.e., data is found in the cache), it is called a "hit," and when data cannot be retrieved from the cache 202 in response to the query (i.e., data is not found in the cache and requires fetching from memory), it is called a "miss." The number (count value) of "hits" and "misses" may be recorded by the aforementioned counter(s) 208.

For example, at 304, if the server 110 determines that the file 202X is stored and accessible in the cache 202, then the data corresponding to the file 202X may retrieved from the cache 202. This "hit" may then be recorded (counted) by a counter 208 to maintain a count value for the requested file 202X. Each time a "hit" occurs in the cache 202 for the requested file 202X, the counter 208 is updated at 306. For example, a hit counter is incremented to indicate a hit has occurred in the cache 202.

If the server 110 determines at 304 that file 202X is not stored in the cache 202, then the requested file 202X is retrieved (fetched) from memory (such as secondary memory 204) for storage in the cache 202. In this instance, a counter 208 associated with the requested file 202X is updated to reflect that accessing the cache 202 resulted in a "miss." For example, a miss counter is incremented to indicate a miss has occurred in the cache 202.

In one embodiment, the counter(s) 208 records the time of access in the cache 202. For example, when a request to access a specific file 202X or page 202N is processed by the server 110 at 302, the cache 202 is first accessed to determine whether the file 202X or page 202N is already stored in the cache 202.

In one other embodiment, the type of access may be dependent upon the query being processed, and individual counters 208 may correspond to different types of access. For example, the type of access may be a read access, a write access, a time access, etc.

Figure 4:
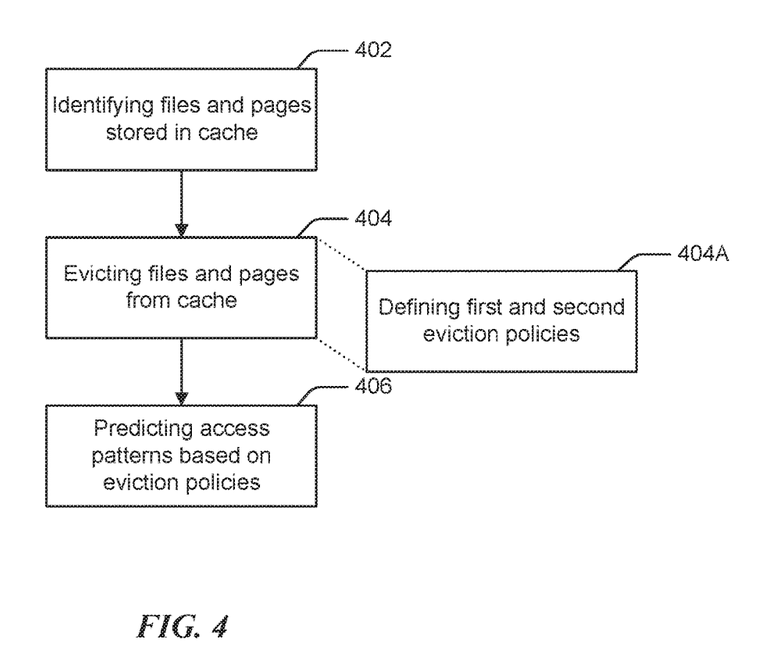
FIG. 4 illustrates a flow diagram of predicting access patterns in accordance with FIGS. 1-3.

FIG. 4 illustrates a flow diagram of predicting access patterns in accordance with FIGS. 1-3. Similar to FIG. 3, the process described below may be implemented by server 110. However, it is appreciated that any component depicted in the example systems 100 and 200 (or the node and system described in FIGS. 8 and 9 below) may be responsible for implementation of the process.

At 402, files 202B-202X and pages 202A-202N previously stored in the cache 202 are identified. In one embodiment, files 202B-202X and pages 202A-202N are identified as stored in the cache 202 along with a count value that determines the number of references that has been made to a particular file 202X and/or page 202N. For example, for a file 202X stored in cache 202, the server 110 identifies the file 202X as accessible in the cache 202 and that the same file 202X has been referenced (e.g., accessed) 30 times over the last 10 minutes.

Once files 202B-202X or pages 202A-202N have been identified at 402, the server 110 may begin to evict data stored in the cache 202 based on various eviction policies at 404, beginning with file eviction followed by page eviction, as explained in more detail below. In one embodiment, the eviction policies may evict data (e.g., file or page) which has the lowest probability of being accessed or referenced. Such probabilities or patterns of access may be determined, for example, based on access count (e.g., least accessed) and access time (e.g., accessed least recently) as determined by the counters 208. The eviction policies may be defined, in one embodiment, based on the access count and access time as determined by the counters 208 at 404A.

At 406, access patterns of the files 202B-202X or pages 202A-202N stored in the cache 202 may be predicted. Access prediction can be based on the counters 208 that monitor data access. For example, a counter 208 may be a read counter that counts the number of references being made to a particular page 202N. Using this information, the probability that each data item in the cache will be accessed in the future may be predicted. In some embodiments, the prediction model can generate a probability for each data item that indicates the likelihood the data item will be accessed within a specified period of time, will be accessed more than a specified number of times in the future, and/or other access predictions.

In one embodiment, access count and access time are recorded by the counters 208 and stored as historical data for use to predict future access patterns. For example, the historical data may be used to predict the probability of future accesses based on the associated pattern.

Figure 5:
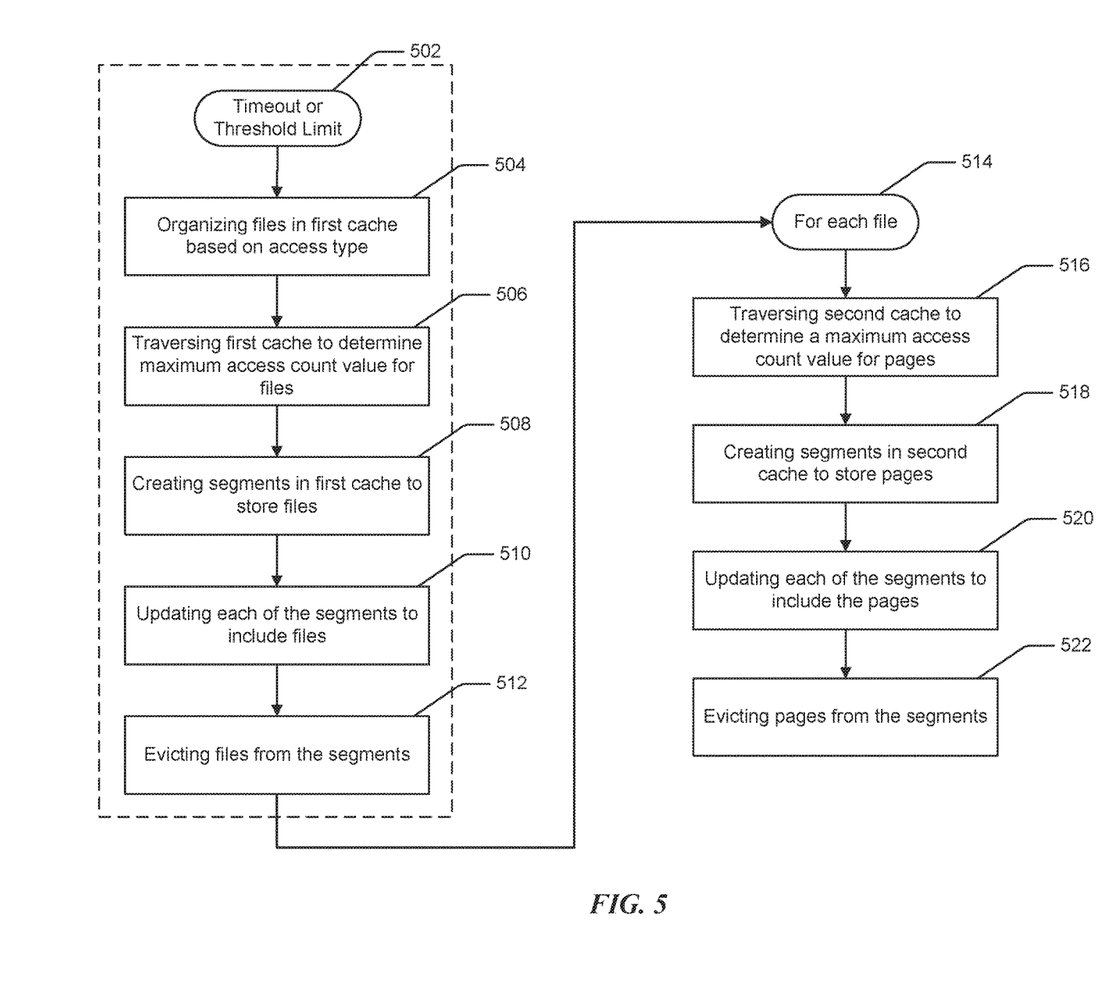
FIG. 5 illustrates an example flow diagram of evicting data from a cache in accordance with FIGS. 3 and 4.

FIG. 5 illustrates an example flow diagram of evicting data from a cache in accordance with FIGS. 3 and 4. The process may be implemented in one embodiment by the server 110, which includes the indexing engine 114, search engine 115 and file system 117 (and inode 117A). As described above, the process is not limited to implementation by the server 110, but may also be implemented using any component in the systems described in FIGS. 1, 2, 8 and 9.

The eviction of data by server 110 uses a counter based eviction policy that is based on counters 208 such as access count, read access count, write access count and last access time. As explained above, and with reference to FIG. 3, the counters 208 may be associated with each inode and cache pages. Using counters 208 at the file-level cache, a file access count may be determined (e.g., how many times the file was accessed and last access time of the file). For each file, counters 208 at the page-level cache may then determine file access patterns (e.g., sequential or random access).

The process begins at 502, after the cache 202 has reached a threshold limit (e.g., the cache is full) or a timeout (e.g., a user session has ended) has occurred.

Data stored in the file system, such as file system 117, may be logically organized as a hierarchical structure of storage objects such as directories and files. Each file may be associated with a set of storage (e.g., disk) blocks configured to store data, whereas each directory may be a specially-formatted file in which information about other files and directories are stored. In some embodiments, the file system organizes file data by using data structures, such as but not limited to, inode data structures, to represent the files in the file system. Once data in the file data is stored (as described above with reference to FIG. 3), it may be organized. In one example embodiment, the data is stored based on an access type (e.g., an application specific parameter, such as read access, write access, time of access, etc.) at 504.

At 506, the hierarchical structure that represents the stored data may be traversed to determine a maximum access count value for the data. For example, the index cache tree data structure (explained above) may be traversed to search each of the files 202B-202X to find the file 202N that has been referenced (in this case accessed) the greatest number of times (the counter associated with the file has a count value larger than all other files—the maximum access count value).

Using the maximum access count value found at 506, segments (or bins) are created in the cache 202 to store each of the files 202X into groups (or ranges) based on count value at 508. The number of segments formed in the cache, in one example embodiment, is equal to the maximum access count value divided by a predefined value N (which may also be an application specific parameter), where each segment represents a range of count values up and until the maximum access count value, as explained further below with reference to FIGS. 6A and 6B.

As files 202B-202X are referenced, the corresponding counters 208 are updated to reflect the references. To ensure that the files 202B-202X stored in the cache 202 remain grouped in the proper segment (remain in the appropriate segment range), the segments are periodically updated to include the files 202B-202X having the count value falling within the corresponding segment range at 510.

Files 202B-202X may then be evicted from the segments, beginning with the segment having a lowest range (the segment including the coldest files), until a file eviction ratio R is satisfied at 512. The file eviction ratio may be set, for example, by the client 120 or an operator of the system 100 (FIG. 1). For example, the server 110 may evict a file 202X based on historical access count data which has the lowest probability of future access. The server 110 may also have access to other information (e.g., service level objectives and current system metrics) which can be combined with the access count in order to determine which data can be evicted.

As an example, a first file has six data accesses within the first hour and three data accesses within the second hour. A second file also has six data accesses within the first hour, but only two within the second hour. A third file has one access each hour. Assume that at hour two the cache requires eviction of some data (e.g., due to memory being full). The file eviction policy would evict the third file followed by the second file based on these files having been accessed the least. However, suppose that these same data access patterns were previously identified from other data sets (i.e., prior data sets showed the same or similar patterns). Then, the data access patterns could be used to predict future accesses based on the patterns previously identified. As a result, the first file could be evicted at hour two since the data access patterns would indicate that that data would be the least likely to be accessed again in the near future.

After eviction of the files and/or segments from the cache 202, at 514, the server 110 begins a similar process for each of the files at the page-level.

At 516, the data structure representing the pages 220A-202N stored in the cache 202 is traversed to determine a maximum access count value for each of the pages 202A-202N, similar to traversing the data structure for the files 202B-202X. Using the maximum access count value found at 516, segments (or bins) are created in the cache 202 to store each of the pages 202N into groups (or ranges) based on count value at 518. The number of segments formed in the cache, in one example embodiment, is equal to the maximum access count value divided by a predefined value N, where each segment represents a range of count values up and until the maximum access count value, as explained further below with reference to FIGS. 7A and 7B.

As pages 202A-2020N are referenced, the corresponding counters 208 are updated to reflect the references. To ensure that the pages 202A-202N stored in the cache 202 remain grouped in the proper segment (remain in the appropriate segment range), the segments are periodically updated to include the pages 202N having the count value falling within the corresponding segment range at 520.

Pages 202A-202N may then be evicted from the segments, beginning with the segment having a lowest range (the segment including the coldest files), until a page eviction ratio T is satisfied at 522. Similar to the file eviction ratio R, the page eviction ratio may be set, for example, by the client 120 or an operator of the system 100 (FIG. 1).

Figure 6A:
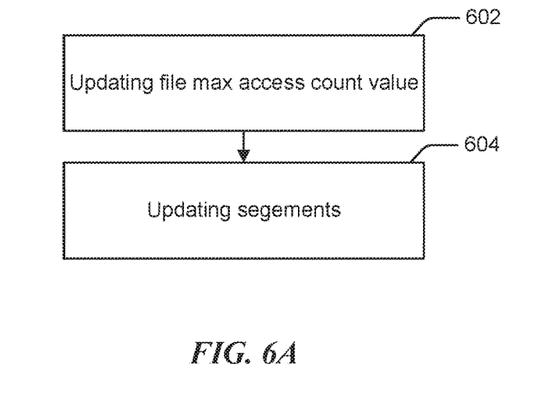
FIGS. 6A and 6B illustrate the process of diving memory into segments for storing files in accordance with FIG. 5.
Figure 6B:
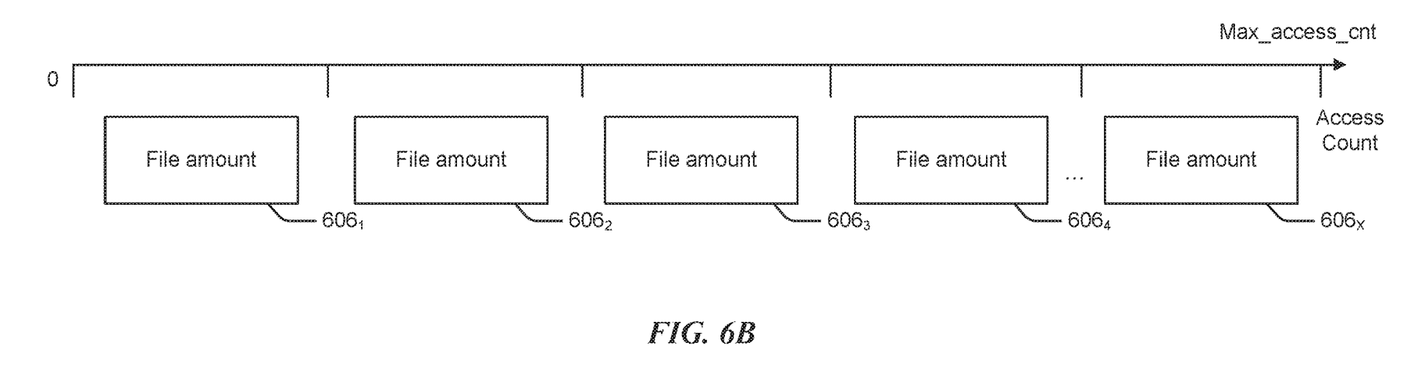

FIGS. 6A and 6B illustrate the process of diving memory into segments for storing files in accordance with FIG. 5. In the disclosed example embodiment, an application (such as a file server or web server) can dictate the type of eviction based on application specific parameters. As briefly described above, the application specific parameters may include, but are not limited to, write access, read access, time of access, etc. and may be used to decide type of eviction. For purposes of this example, we assume that the parameter is a write access that is based on a write counter present in the inode data structure, and that five (5) files are stored in the cache 202.

After traversing the inode cache, the server 110 determines that the five files have the following write access count values, with a maximum access count value equal to 200 (File 3).

TABLE I

| Files | Write Access Count Value |
|---|---|
| File 1 | 100 |
| File 2 | 10 |
| File 3 | 200 |
| File 4 | 1 |
| File 5 | 8 |

At 602, the maximum access count value is updated to reflect that file 3 has been write accessed 200 times.

Using the maximum access count value (currently=200), segments $606_1$-$606_x$ are formed by dividing the maximum access count value by N (a predefined number set to 10 in this example) to provide the number of segments to store the files 202B-202X. For example, the maximum access count (max_access_cnt) divided by N=200/10=20 segments, each of which has a range of 10—i.e., segment $606_1$ has a range 0-9, segment $606_2$ has a range 10-19 . . . segment $606_x$ has a range 190-199. The table below illustrates the divided segments, including range and file count.

TABLE II

| | Range | | | | |
|---|---|---|---|---|---|
| | 0-9 | 10-19 | 20-29 | . . . | 190-199 |
| File Count | 2 (file 4 and 5) | 0 | 0 | . . . | 1 |

With reference to FIG. 6B, each of the segments store one or more files 202B-202X having an access count falling within one of the ranges. Following the above-example, files 4 and 5 in Table I each have an access count that falls between the count range 0-9. Accordingly, files 4 and 5 are placed (stored) in segment $606_1$. The file amount is deemed to be the number of files stored in any one segment $606_1$-$606_x$ (which may also be zero).

In one embodiment, at 604, segments are updated to add and remove files as the file count changes (e.g., as files are referenced file count values are increased).

Segments including files that are accessed the least, for example files having a lowest count value or a least recent access time, are deemed the coldest data, whereas files that are accessed the most, for example files having a highest count value or a most recent access time, are deemed to be the hottest data. Accordingly, in the example, files in the 0-9 range segment are the "coldest" (least accessed) and files in the 190-199 range segment are the "hottest" (most accessed).

The file eviction ratio R, referenced in the above-discussion of FIG. 5, refers to the memory free ratio (i.e., the percentage of memory to free). For example, if the file eviction ratio R=10%, files are evicted from the segments $606_1$-$606_x$ until 10% of the total cache becomes free, beginning with eviction of the coldest data.

Figure 7A:
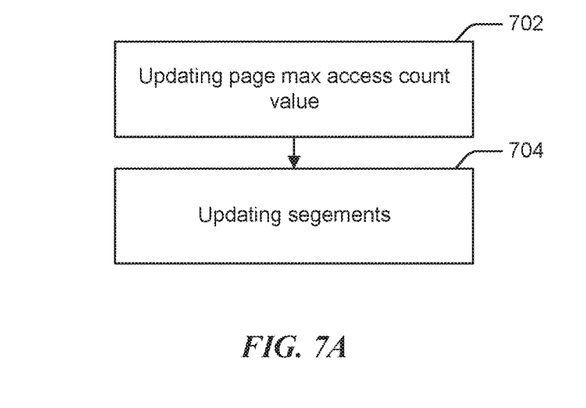
FIGS. 7A and 7B illustrate the process of diving memory into segments for storing pages in accordance with FIG. 5.
Figure 7B:
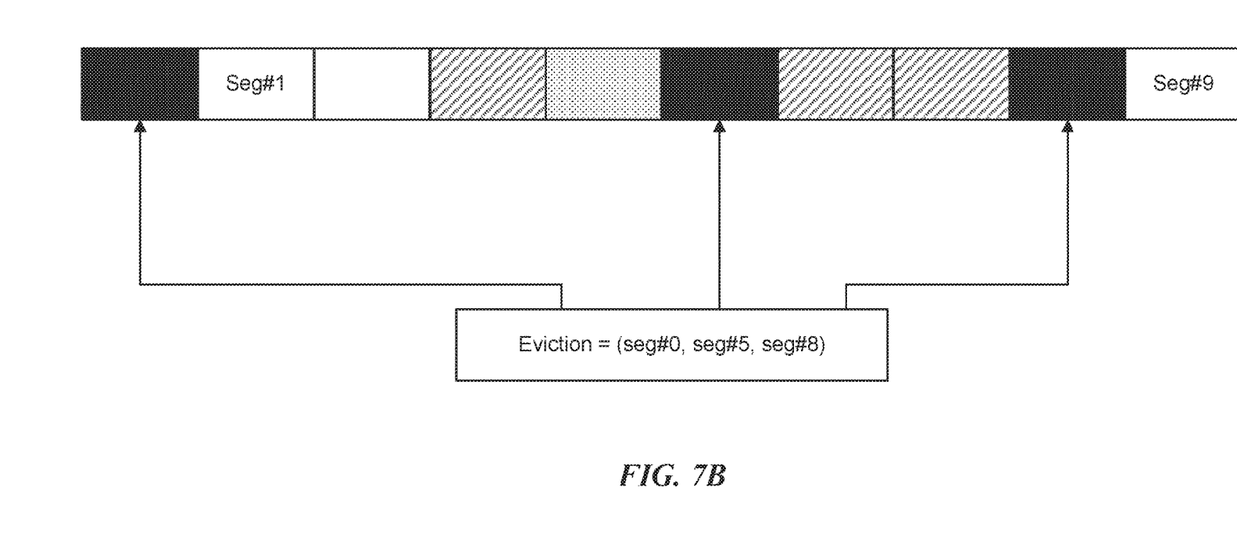

FIGS. 7A and 7B illustrate the process of diving memory into segments for storing pages in accordance with FIG. 5. The example embodiments of FIGS. 7A and 7B continue with the example discussed in FIGS. 6A and 6B. That is, after completing eviction of the files 202B-202X from cache 202, the page eviction process (for each file) begins by evicting files from the segments in the order of coldest segments to hottest segments until reaching a page eviction ration T.

For purposes of discussion, we assume that the process begins with "file 4," which has been stored in segment $606_1$ and is cold data.

After traversing the inode cache, the server 110 determines that file 4 has the following write access count values for each page, with a maximum access count value equal 100 (page 10).

TABLE III

| File 4 | Write access count value |
|---|---|
| Page 1 | 1 |
| Page 2 | 10 |
| Page 10 | 100 |
| Page 3 | 1 |
| Page 5 | 8 |

At 702, the maximum access count value is updated to reflect that page 10 has been write accessed 100 times.

Using the maximum access count value (currently=100), segments 0-9 are formed by dividing the maximum access count value by N (a predefined number set to 10 in this example) to provide the number of segments to store the pages 202A-202N, similar to the process described above with reference to FIGS. 6A and 6B. The table below illustrates the divided segments, including range and page count after the pages are stored in the corresponding segments 0-9, as depicted in FIG. 7B.

TABLE IV

| | Range | | | | |
|---|---|---|---|---|---|
| | 0-9 | 10-19 | 20-29 | 30-39 | 40-49 |
| Page Count | 3 (page 1, 3, 5) | 1 (page 2) | 0 | 0 | 1 |

Each of the segments 0-9 store one or more pages 202A-202N having an access count falling within one of the ranges. Following the above-example, pages 1, 3 and 5 in Table III each have an access count that falls between the count range 0-9. Accordingly, pages 1, 3 and 5 are placed (stored) in segment "0" (seg#0).

In one embodiment, at 704, segments are updated to add and remove pages as the page count changes (e.g., as pages are referenced page count values are increased).

Segments including pages that are accessed the least, for example files having a lowest count value or a least recent access time, are deemed the coldest data, whereas pages that are accessed the most, for example files having a highest count value or a most recent access time, are deemed to be the hottest data. Accordingly, in the example, pages in the 0-9 range segment are the "coldest" (least accessed) and pages in the 40-49 range segment are the "hottest" (most accessed).

The page eviction ratio T, referenced in the above-discussion of FIG. 5, refers to the memory free ratio (i.e., the percentage of memory to free). For example, if the page eviction ratio T=15%, pages are evicted from the segments 0-9 until 15% of the total cache becomes free, beginning with eviction of the coldest data.

Additionally, as discussed above, access time counters may be employed to determine the time of access for a particular page in addition to access count. For example, while page 10 has an access count equal to 50, the access time of page 10 may be earlier than another page when compared to a predefined start time plus a fixed delta (e.g. 30 s). In this regard, segments having a least recent access time may be deemed cold data, even when having a "hot" access count. In the embodiment of FIG. 7B, seg#5 and seg#8 have a least recent access time and are therefore set for eviction along with seg#0.

Figure 8:
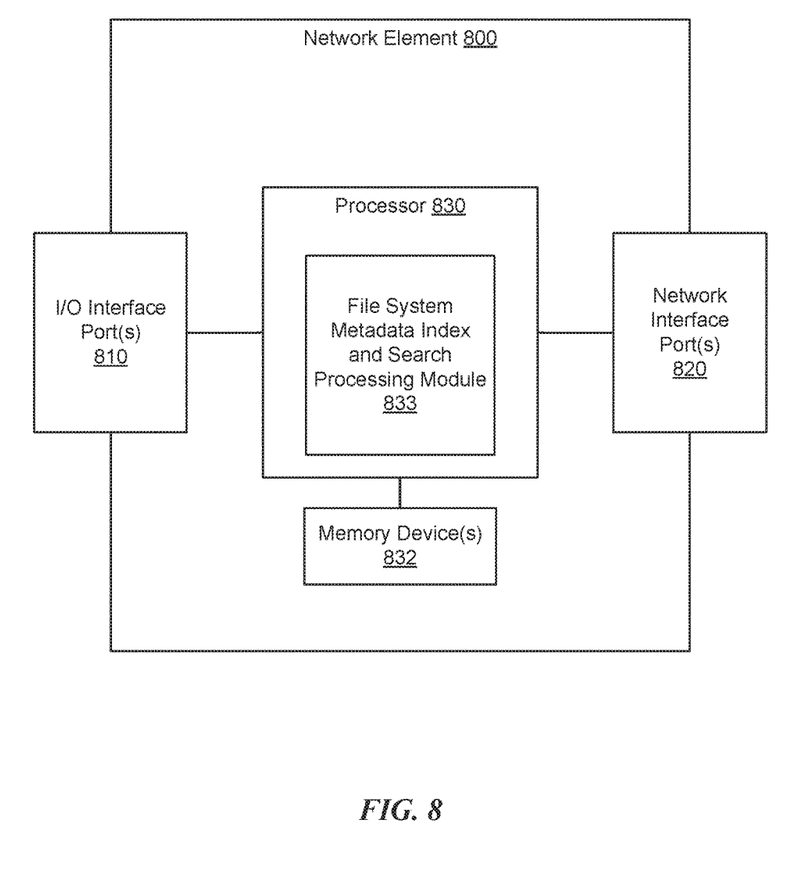
FIG. 8 illustrates an example network element.

FIG. 8 illustrates an example network element. At least some of the features and/or methods described in the disclosure may be implemented in a network apparatus or module such as the network element 800. For instance, the features and/or methods in the disclosure may be implemented using hardware, firmware, and/or software installed to run on hardware.

The network element 800 may be acting as a node, such as a server 110, a client 120, and/or a storage device 130, in a file storage system 117, such as the system 100. The network element 800 may be configured to implement and/or support the metadata indexing and/or search mechanisms described herein. Network element 800 may also be implemented in a single node or as a plurality of nodes.

As shown in FIG. 8, the network element 800 may comprise one or more I/O interface ports 810, and one or more network interface ports 820. The processor 830 may comprise one or more multi-core processors and/or memory devices 832, which may function as data stores, buffers, etc. The processor 830 may be implemented as a general processor or may be part of one or more application specific integrated circuits (ASICs) and/or digital signal processors (DSPs). The processor 830 may comprise a file system metadata index and search processing module 8233, which may perform processing functions of a server or a client and implement the methods and procedures discussed above.

Additionally, the file system metadata index and search processing module 833 effects a transformation of a particular article (e.g., the file system) to a different state. In an alternative embodiment, the file system metadata index and search processing module 833 may be implemented as instructions stored in the memory devices 832, which may be executed by the processor 830. The memory device 832 may comprise a cache for temporarily storing content, e.g., a random-access memory (RAM).

The memory device 832 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 832 may be configured to store metadata DBs, such as the metadata DBs 111.

The I/O interface ports 810 may be coupled to I/O devices, such as the storage device 130, and may comprise hardware logics and/or components configured to read data from the I/O devices and/or write data to the I/O devices. The network interface ports 820 may be coupled to a computer data network and may comprise hardware logics and/or components configured to receive data frames from other network nodes, such as the client 120, in the network and/or transmit data frames to the other network nodes.

It is appreciated that by programming and/or loading executable instructions onto the network element 800, at least one of the processor 830 and/or memory device 832 are changed, transforming the network element 800 in part into a particular machine or apparatus, e.g., a multi-core forwarding architecture, having the novel functionality taught by the present disclosure.

Figure 9:
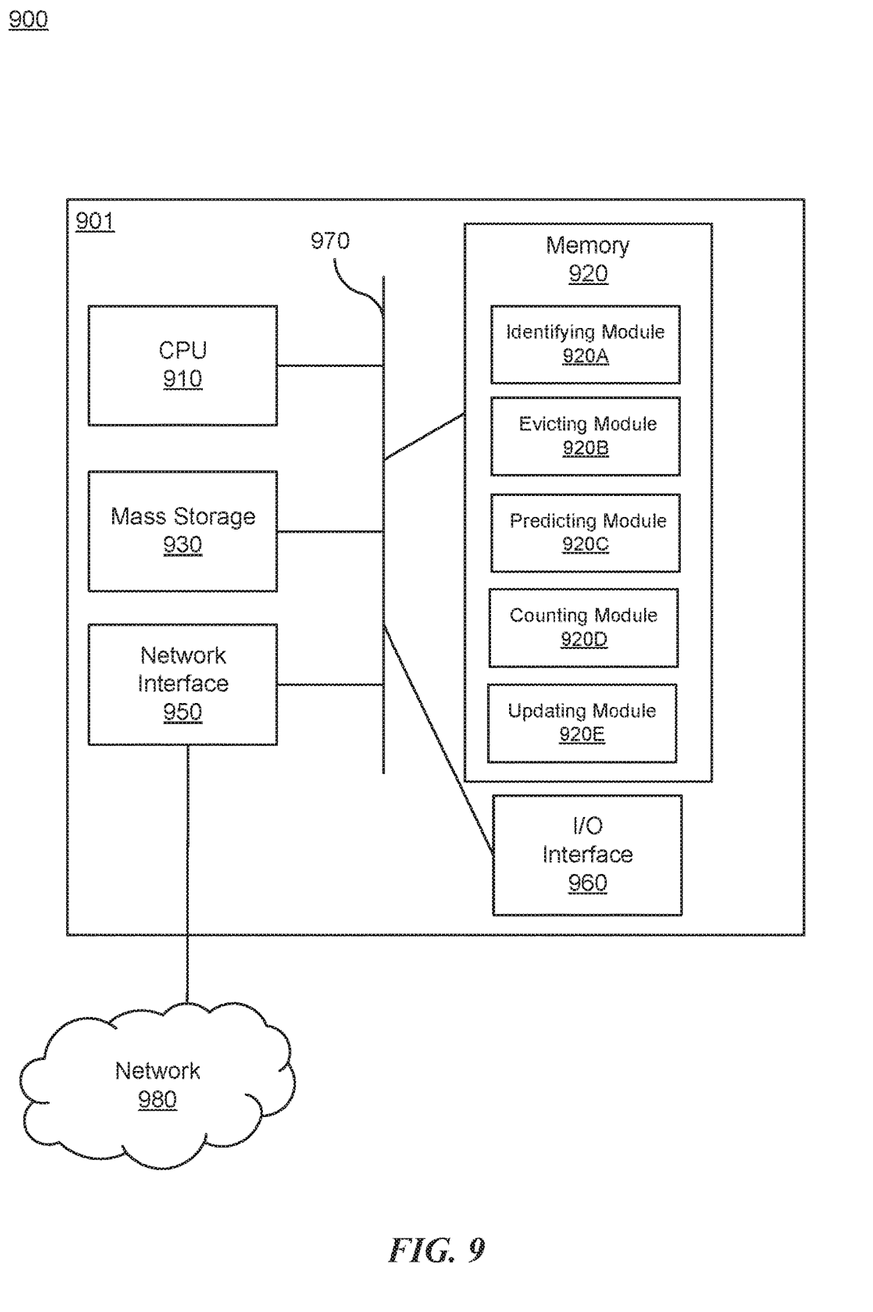
FIG. 9 illustrates a block diagram of a network system that can be used to implement various embodiments.

FIG. 9 is a block diagram of a network device that can be used to implement various embodiments. Specific network devices may utilize all of the components shown, or only a subset of the components, and levels of integration may vary from device to device. Furthermore, the network device 900 may contain multiple instances of a component, such as multiple processing units, processors, memories, transmitters, receivers, etc. The network device 900 may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. In one embodiment, the memory 920 includes an identifying module 920A identifying files stored in a file cache and pages associated with each of the files in a page cache; an evicting module 920B evicting the files in the file cache based on a file eviction policy and, for each of the files, the pages in the page cache based on a page eviction policy; a predicting module 920C predicting an access pattern of the files based on the file and page eviction policies; a counting module 920D counting references to the files stored in the file cache using a first counter and references to the pages stored in the page cache using a second counter; and an updating module 920E updating the first counter each time the files stored in the file cache is referenced and the second counter each time the pages stored in the page cache is referenced.

The mass storage device 930 may comprise any type of storage device configured to store data, programs, and other information and to make the data, programs, and other information accessible via the bus 970. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 801 to communicate with remote units via the networks 880. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

According to the embodiments, the disclosed technology provides the following advantages, including, but not limited to, a counter based eviction policy using counters such as access count, read access count, write access count and last access time. Counters are associated with each inode and cache pages. Using counters at the file level, the system can determine file access count, such as how many times the file was accessed and last access time of the file. This also provides a fine granularity to determine eviction candidate at file level. For each file, counters at the page cache level determine file access pattern (e.g., sequential or random access). Accordingly, the system applies the counter based eviction policy at two levels one at file level another one at cache page level.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for predicting file access patterns, comprising:
    identifying one or more files stored in a first cache and one or more pages associated with each of the one or more files in a second cache;
    evicting the one or more files in the first cache based on a first eviction policy, wherein the first eviction policy comprises
        creating a number of one or more segments equal to a maximum access count value for the one or more files divided by a predefined value, and
        evicting of the one or more files from the number of segments until a first eviction ratio is satisfied,
    evicting, for each of the one or more files, the one or more pages in the second cache based on a second eviction policy; and
    predicting an access pattern of the one or more files based on the first and second eviction policies.

2. The method of claim 1, further comprising:
    counting references to the one or more files stored in the first cache using a first counter and references to the one or more pages stored in the second cache using a second counter;
    updating the first counter each time the one or more files stored in the first cache is referenced and the second counter each time the one or more pages stored in the second cache is referenced;

defining the first eviction policy based on the first counter and the second eviction policy based on the second counter, where each of the first and second counters record an access count value and an access time.

3. The method of claim 2, wherein
counting references to the one or more files stored in the first cache comprises increasing the first counter associated with each of the one or more files when the associated file is accessed in the first cache, wherein the first counter maintains the access count value and access time; and
counting references to the one or more pages stored in the second cache comprises increasing the second counter of the one or more pages associated with the accessed file when the associated page stored in the second cache is accessed, wherein the second counter maintains the access count value and access time.

4. The method of claim 2, wherein the first eviction policy comprises:
organizing the one or more files stored in the first cache based on an access type;
traversing the first cache to determine the maximum access count value for the one or more files based on a count value of the first counter;
creating the one or more segments in the first cache to store the one or more files;
updating each of the one or more segments to include the one or more files having the count value falling within a range of the one or more segments; and
evicting the one or more files from the one or more segments beginning with the one or more segments having a lowest range.

5. The method of claim 4, wherein
the updating comprises:
updating the maximum access count value to the count value of the one or more files having a maximum count value; and
the dividing comprises:
updating the one or more segments in the first cache such that the number of segments is equal to the updated maximum access count value divided by the predefined value.

6. The method of claim 5, wherein a range value of each of the one or more segments is defined as the maximum access count value divided by a total number of the one or more segments.

7. The method of claim 2, wherein the second eviction policy, for each of the one or more files, comprises:
traversing the second cache to determine a maximum access count value for the one or more pages based on a count value of the second counter;
creating one or more segments in the second cache to store the one or more pages, where the number of segments is equal to the maximum access count value divided by a predefined value;
updating each of the one or more segments to include the one or more pages having the count value falling within a range of the one or more segments; and
evicting the one or more pages from the one or more segments, beginning with the one or more segments having a lowest range, until a second eviction ratio is satisfied.

8. The method of claim 7, wherein
the updating comprises:
updating the maximum access count value to the count value of the one or more pages having a maximum count value; and the dividing comprises:
updating the one or more segments in the second cache such that the number of segments is equal to the updated maximum access count value divided by the predefined value.

9. The method of claim 7, wherein the evicting further comprises evicting the one or more pages from the second cache based on the access time beginning with the one or more segments having a least recent time of access.

10. The method of claim 2, wherein the first and second counters use the access count value and the access time to determine the access pattern for each of the one or more files and pages as one of sequential or random.

11. The method of claim 10, further comprising storing the access pattern for each of the one or more files and pages to predict the access pattern of the one or more files.

12. A device for predicting file access patterns, comprising:
a non-transitory memory storage comprising instructions; and
one or more processors in communication with the memory, wherein the one or more processors execute the instructions to perform operations comprising:
identifying one or more files stored in a first cache and one or more pages associated with each of the one or more files in a second cache;
evicting the one or more files in the first cache based on a first eviction policy, wherein the first eviction policy comprises
creating a number of one or more segments equal to a maximum access count value for the one or more files divided by a predefined value, and
evicting of the one or more files from the number of segments until a first eviction ratio is satisfied,
evicting, for each of the one or more files, the one or more pages in the second cache based on a second eviction policy; and
predicting an access pattern of the one or more files based on the first and second eviction policies.

13. The device of claim 12, wherein the one or more processors further execute the instructions to perform operations comprising:
counting references to the one or more files stored in the first cache using a first counter and references to the one or more pages stored in the second cache using a second counter;
updating the first counter each time the one or more files stored in the first cache is referenced and the second counter each time the one or more pages stored in the second cache is referenced;
defining the first eviction policy based on the first counter and the second eviction policy based on the second counter, where each of the first and second counters record an access count value and an access time.

14. The device of claim 13, wherein
counting references to the one or more files stored in the first cache comprises executing the one or more processors to perform operations comprising increasing the first counter associated with each of the one or more files when the associated file is accessed in the first cache, wherein the first counter maintains the access count value and access time; and
counting references to the one or more pages stored in the second cache comprises executing the one or more processors to perform operations comprising increasing the second counter of the one or more pages associated with the accessed file when the associated page stored in the second cache is accessed, wherein the second counter maintains the access count value and access time.

15. The device of claim 13, wherein the first eviction policy comprises executing the one or more processors to perform operations comprising:
   organizing the one or more files stored in the first cache based on an access type;
   traversing the first cache to determine the maximum access count value for the one or more files based on a count value of the first counter;
   creating the one or more segments in the first cache to store the one or more files;
   updating each of the one or more segments to include the one or more files having the count value falling within a range of the one or more segments; and
   evicting the one or more files from the one or more segments beginning with the one or more segments having a lowest range.

16. The device of claim 13, wherein the second eviction policy, for each of the one or more files, comprises executing the one or more processors to perform operations comprising:
   traversing the second cache to determine a maximum access count value for the one or more pages based on a count value of the second counter;
   creating one or more segments in the second cache to store the one or more pages, where the number of segments is equal to the maximum access count value divided by a predefined value;
   updating each of the one or more segments to include the one or more pages having the count value falling within a range of the one or more segments; and
   evicting the one or more pages from the one or more segments, beginning with the one or more segments having a lowest range, until a second eviction ratio is satisfied.

17. A non-transitory computer-readable medium storing computer instructions for predicting file access patterns, that when executed by one or more processors, perform the steps of:
   identifying one or more files stored in a first cache and one or more pages associated with each of the one or more files in a second cache;
   evicting the one or more files in the first cache based on a first eviction policy, wherein the first eviction policy comprises
      creating a number of one or more segments equal to a maximum access count value for the one or more files divided by a predefined value, and
      evicting of the one or more files from the number of segments until a first eviction ratio is satisfied,
   evicting, for each of the one or more files, the one or more pages in the second cache based on a second eviction policy; and
   predicting an access pattern of the one or more files based on the first and second eviction policies.

18. The non-transitory computer-readable medium of claim 17, when further executed by one or more processors, perform the steps of:
   counting references to the one or more files stored in the first cache using a first counter and references to the one or more pages stored in the second cache using a second counter;
   updating the first counter each time the one or more files stored in the first cache is referenced and the second counter each time the one or more pages stored in the second cache is referenced;
   defining the first eviction policy based on the first counter and the second eviction policy based on the second counter, where each of the first and second counters record an access count value and an access time.

19. The non-transitory computer-readable medium of claim 18, wherein
   counting references to the one or more files stored in the first cache comprises executing the one or more processors to perform the step of increasing the first counter associated with each of the one or more files when the associated file is accessed in the first cache, wherein the first counter maintains the access count value and access time; and
   counting references to the one or more pages stored in the second cache comprises executing the one or more processors to perform the step of increasing the second counter of the one or more pages associated with the accessed file when the associated page stored in the second cache is accessed, wherein the second counter maintains the access count value and access time.

20. The non-transitory computer-readable medium of claim 18, wherein the first eviction policy comprises executing the one or more processors to perform the steps of:
   organizing the one or more files stored in the first cache based on an access type;
   traversing the first cache to determine the maximum access count value for the one or more files based on a count value of the first counter;
   creating the one or more segments in the first cache to store the one or more files;
   updating each of the one or more segments to include the one or more files having the count value falling within a range of the one or more segments; and
   evicting the one or more files from the one or more segments beginning with the one or more segments having a lowest range.

21. The non-transitory computer-readable medium of claim 18, wherein the second eviction policy, for each of the one or more files, comprises executing the one or more processors to perform the steps of:
   traversing the second cache to determine a maximum access count value for the one or more pages based on a count value of the second counter;
   creating one or more segments in the second cache to store the one or more pages, where the number of segments is equal to the maximum access count value divided by a predefined value;
   updating each of the one or more segments to include the one or more pages having the count value falling within a range of the one or more segments; and
   evicting the one or more pages from the one or more segments, beginning with the one or more segments having a lowest range, until a second eviction ratio is satisfied.

* * * * *